Feb. 12, 1952 L. P. CROSMAN 2,585,630
DIGIT SHIFTING CIRCUIT
Filed May 3, 1949 4 Sheets-Sheet 1

INVENTOR.
LORING P. CROSMAN
BY Ralph W. E. Bitner
ATTORNEY

Feb. 12, 1952 L. P. CROSMAN 2,585,630

DIGIT SHIFTING CIRCUIT

Filed May 3, 1949 4 Sheets-Sheet 2

INVENTOR.
LORING P. CROSMAN

BY Ralph E. Bitner

ATTORNEY

Feb. 12, 1952 L. P. CROSMAN 2,585,630

DIGIT SHIFTING CIRCUIT

Filed May 3, 1949 4 Sheets-Sheet 3

*INVENTOR.*
LORING P. CROSMAN
BY Ralph E. Bitner
ATTORNEY

Feb. 12, 1952 L. P. CROSMAN 2,585,630

DIGIT SHIFTING CIRCUIT

Filed May 3, 1949 4 Sheets-Sheet 4

INVENTOR.
LORING P. CROSMAN
BY Ralph W. E. Bitner.
ATTORNEY

Patented Feb. 12, 1952 2,585,630

UNITED STATES PATENT OFFICE 2,585,630

DIGIT SHIFTING CIRCUIT

Loring P. Crosman, Darien, Conn., assignor to Remington Rand, Inc., New York, N. Y., a corporation of Delaware Application May 3, 1949, Serial No. 91,060

9 Claims. (Cl. 235—133)

This invention relates to circuits involving electronic computing and storage devices. It includes a means for shifting digit values from one accumulator order to the next higher order. While the invention is subject to a wide range of applications, it is especially suited for use in electronic computers for arithmetic processes and the method of recording the contents of an accumulator using a step printer.

Prior electronic computers have employed a multiplying circuit which had the multiplication table built into the circuit. While such an arrangement produces fast computing action, it requires a large number of vacuum tubes. The present invention contemplates the use of repeated addition for multiplication and repeated substraction for division and the use of the present shifting circuit for aligning the digits during both of the operations.

Prior electronic computers have generally transferred the solution to a multiple printer or to a punch for operation on punched data cards. If a step printer, such as an electric typewriter, is used, a digit shifting means reduces the complexity of the reading out process. The typewriter is coupled to one denominational order (usually the highest) and arranged to print whatever is registered in that order. Then, with a shifting operation, all digit values are successively shifted from the lower to the higher orders and the values are typed in the correct sequence.

One of the objects of the present invention is to avoid some of the complexities of prior art electronic computers and make possible a complete computer with fewer components.

Another object of the invention is to improve the flexibility of electronic calculators by digit shifting to reduce the number of vacuum tubes required.

Another object of the invention is to improve the shifting circuit so that all digit values registered in an accumulator may be shifted at one operation.

One of the features of the present invention includes a digit shifting circuit for shifting a digit value from one denominational order of an electronic accumulator to the next higher order. A plurality of electronic trigger stages makes up the accumulator, each trigger stage representing a digit value. An equal number of gate stages is employed for controlling the application of a shift pulse, each gate stage being normally biased so that it passes no current. To provide the necessary gate action, each anode of each trigger stage is coupled to one of the control electrodes of a gate stage. And to provide the necessary trigger action, the anodes of each triode in each gate stage are coupled to the control electrodes of the corresponding trigger stage in the next higher denominational order.

For a better understanding of the present invention, together with other and further objects thereof, reference is made to the following description taken in connection with the accompanying drawings.

Figure 1:
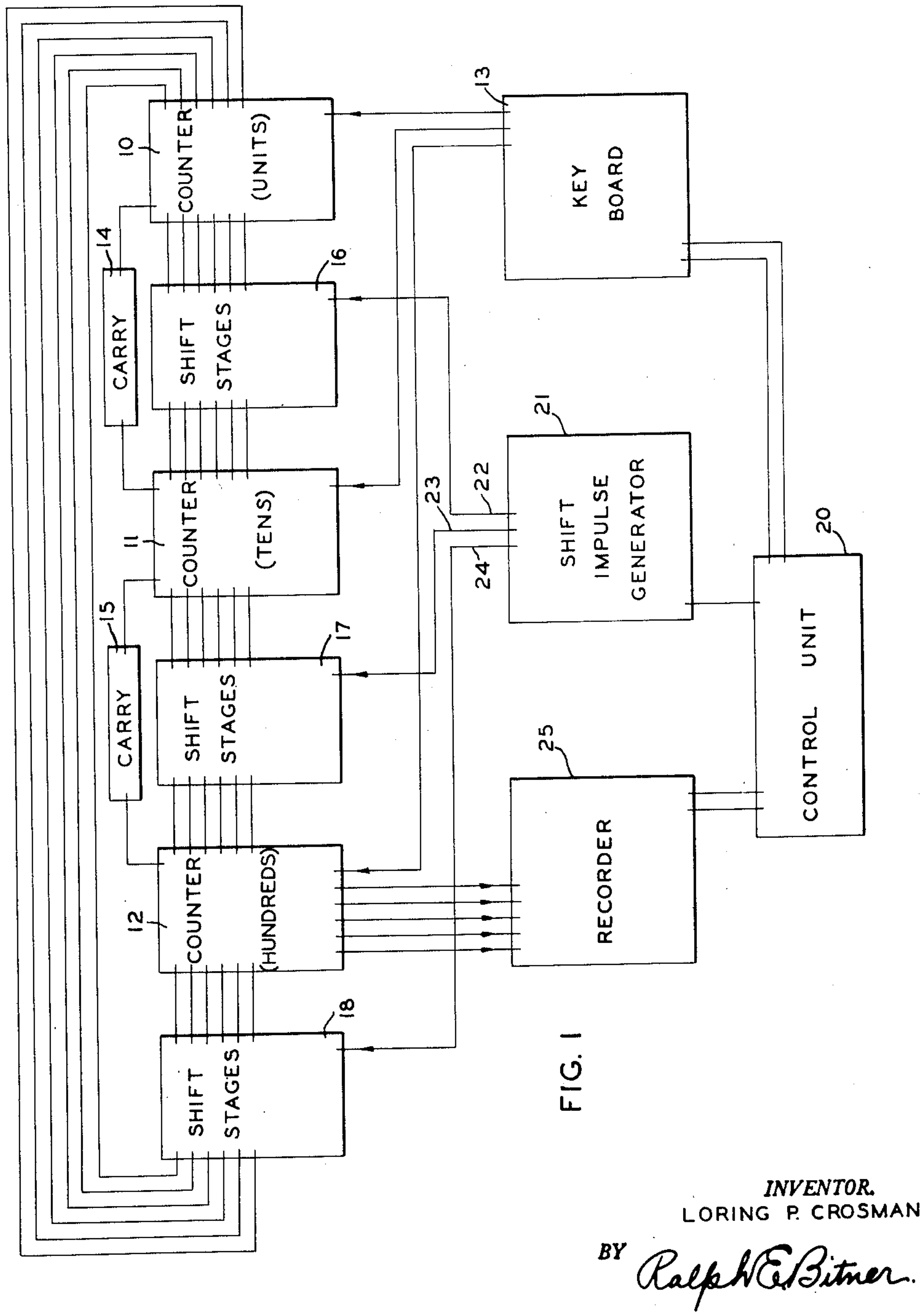
Fig. 1 is a block diagram of the entire accumulator system and shows the more important control connections.

Referring now to Fig. 1, the system will be described generally without specific reference to the details of the invention. The accumulator comprises three counter units 10, 11, and 12. Digit values may be entered into these counters from a keyboard 13 in a manner well known to the art. Successive entries result in an adding operation which may call for the use of carry stages 14 and 15. When the problem is finished and it is desired to record the result, a number of arrangements may be employed to print the total. For example, each counter may be wired to a printing sector and all the digits can then be printed simultaneously. Or, a printing unit may be connected to each counter in succession to print one digit at a time. The printing system utilized by the present invention employs a third method which comprises the printing of a single digit taken from the highest order, then shifting all digit values to the next higher order and again printing the single digit that is in the highest order, a third shift and a third printing completes the recording of the number in the three counter accumulator.

The shifting operation is accomplished by means of three banks of shift stages 16, 17, and 18. Each bank contains a stage (double triode) which corresponds to one of the trigger stages in a counter bank. The shift stages, which will be described in detail hereinafter, are electronic gate units which pass or obstruct pulses, depending upon the potential of their control electrodes. For all adding, subtracting, and other operations which enter values into the counter units, the shift gates are connected in the circuit so that the potential of their control electrodes is at or below the cut-off value and no current flows through the gate anode circuits.

When it is desired to shift digit values, a control unit 20 sends a signal pulse to a shift impulse generator 21 and starts a multivibrator which generates a train of pulses that are applied over conductors 22, 23, and 24 to all the gates in all the shift units. Each pulse sent to the gate units causes a pulse to be sent to an actuated trigger stage in the next lower order to normalize the stage and also causes a pulse to be sent to the corresponding trigger stage in the next higher order to actuate it and transfer its conductivity so that it represents a digit value.

A recorder 25, which may be an electric typewriter, is conditioned by the control unit 20 to receive and record values taken from the highest order counter 12 as soon as the shift signal pulse is sent out. As each shift is made, the recorder prints the digit value until the complete number has been recorded.

As shown in Fig. 1, the shifting operation follows a ring pattern, that is, each digit value is shifted to the next higher counter until it reaches the highest, then it is returned to the lowest counter after which it is shifted to successively higher counters.

Figure 2:
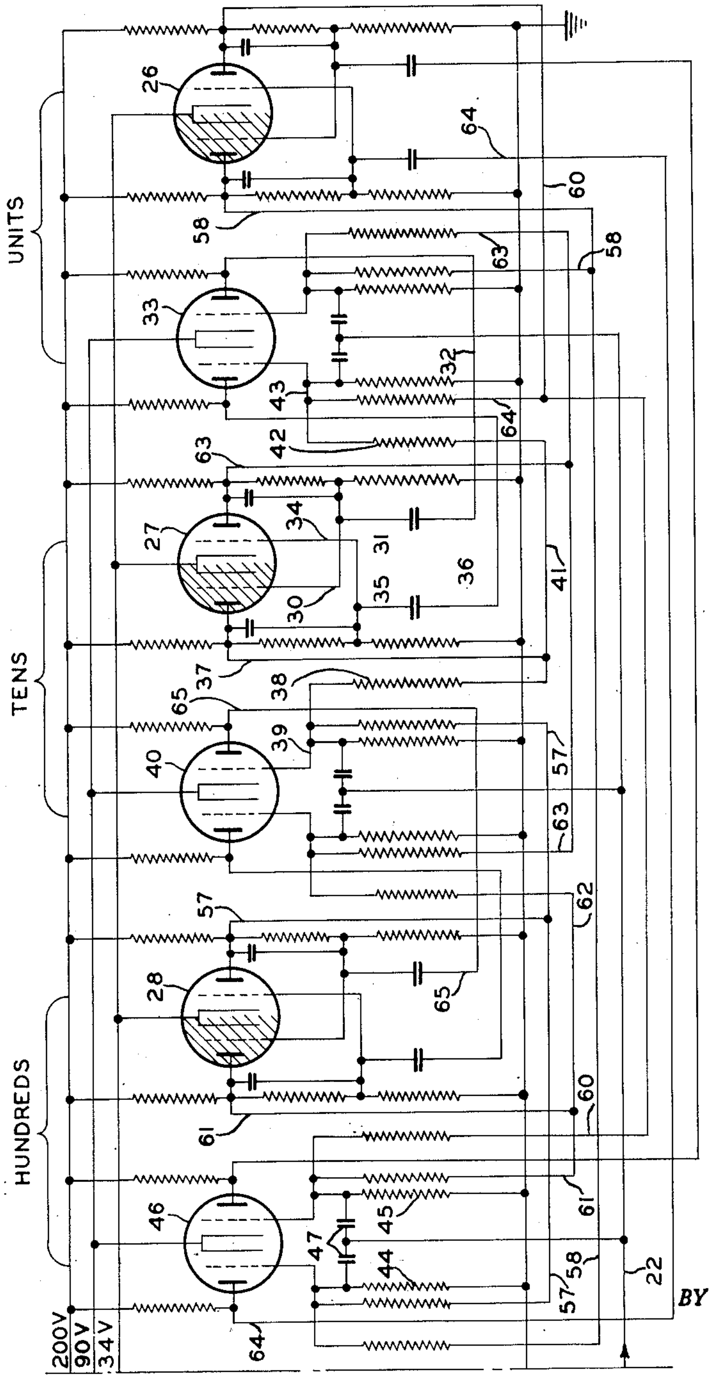
Fig. 2 is a schematic wiring diagram of connections of three orders taken from the accumulator. Only the stages which represent a single digit value are shown.

The stages shown in Fig. 2 are only a few of the many components that are necessary for a complete accumulator system. The stages shown represent only those that are used to receive and store a single valued digit in three denominational orders. A complete accumulator will contain all the stages necessary to record and store all digits, 0 to 9, inclusive, in as many denominational orders that are used.

The trigger stages contain double triodes 26, 27, and 28, the cross-hatched lines indicating the conducting side of the tube when in the normal or zero indicating condition. Each triode trigger stage, in addition to the usual trigger circuit components, has coupling circuits to the corresponding gate stage in the next lower denominational order. For example, one of the coupling lines runs from the left hand control electrode of tube 27 over conductor 30, through capacitor 31, over conductor 32 to the right hand anode of gate tube 33. A similar coupling line runs from the right hand control electrode of tube 27 over conductor 34, through capacitor 35, over conductor 36, to the left hand anode of gate tube 33. Similar coupling lines are supplied to all other trigger and gate tube combinations.

In addition to the above, each anode of all trigger stages in the system shown in Fig. 2 is coupled to the control electrode of two gate stages. For example, the left hand anode of tube 27 is connected by conductor 37 through resistor 38 and over conductor 39 to the right hand control electrode of tube 40. A branch connection may be traced over conductors 37 and 41, through resistor 42, over conductor 43 to the left hand control electrode of tube 33. Similar coupling lines are supplied to all other trigger and gate tube combinations.

It should be noted that all gate stages are supplied with resistors joining their control electrodes to a ground line such as resistors 44 and 45 in supply lines to tube 46. The cathodes of all gate tubes are connected directly to a 90 volt line which would apply a negative potential of 90 volts to all gate control electrodes if there were no other voltage supply lines. However, each control electrode is connected, through resistors, to two anodes in the trigger stage array. The potential of the anodes may be either 60 volts or 160 volts, depending upon the conducting condition of the triode. The coupling and biasing resistors are arranged so that if both connected anodes are at high potential the control electrode is at a potential of 75 volts above ground or −15 volts with respect to the cathode. If one anode is high and the other low, the control electrodes is 53 volts above ground or −37 volts with respect to the cathode. If both anodes are low, the control electrode is 30 volts above ground and −60 volts with respect to the cathode.

The shift pulse which is applied to all control electrodes of all gate stages travels over conductor 22 and is coupled to the control electrodes by branch conductors and coupling capacitors, such as 47, in stage 46.

Figure 3:
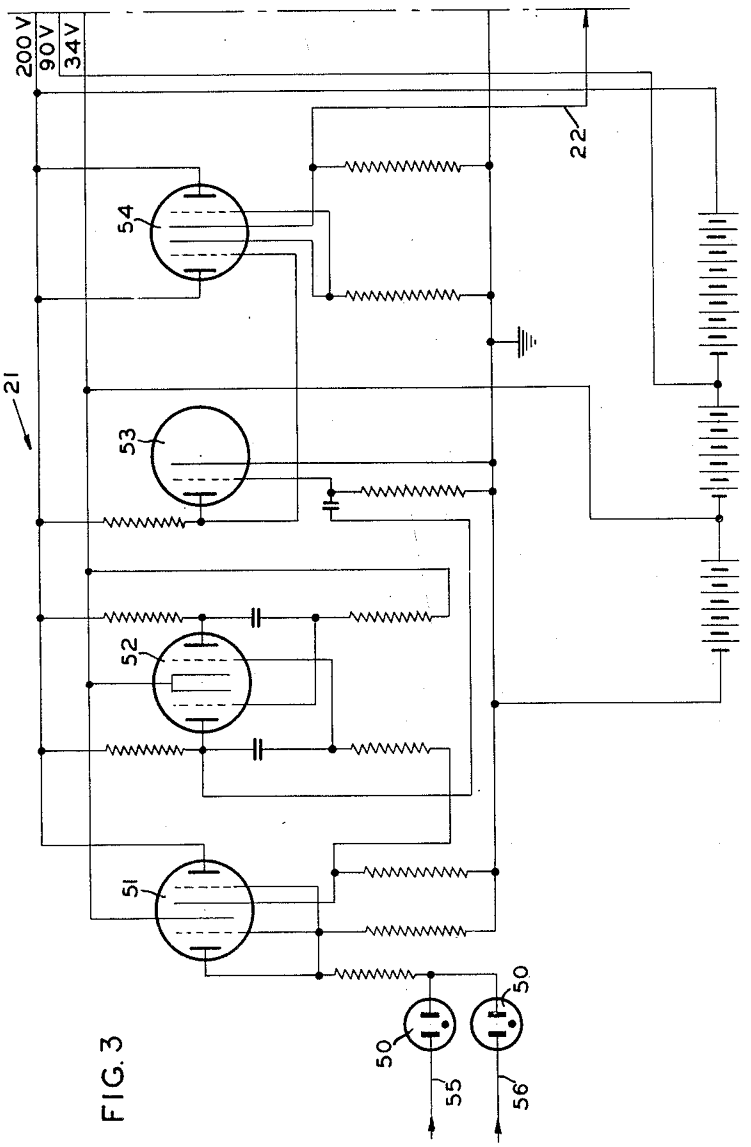
Fig. 3 is a schematic wiring diagram of connections of the pulse generator which causes the shifting operation.

The shift pulse is generated in a control circuit shown in Fig. 3, which contains one or more neon lamps 50 and four electronic tubes 51, 52, 53, and 54. The signal for a shift is applied over conductor 55 or 56 to light one of the neon lamps. The left hand side of tube 51 is a diode clipper which has its anode connected to the control electrode and acts as a wave shaper. The right hand side of 51 is an amplifier which is cathode-follower coupled to a multivibrator 52. This multivibrator is normally in its non-generating condition and starts to produce pulses only when its right hand control electrode receives the proper potential from stage 51.

The multivibrator pulses are sent to an inverter and shaper 53, and then to a two stage cathode follower amplifier 54. From there the pulses are sent over conductor 22 to the gate stages (see Fig. 2). Since the multivibrator must receive a control voltage which varies within certain limits, the diode clipper stage 51 is designed to limit the voltage applied to the right hand control electrode of stage 51 to 34 volts, the potential at which diode conduction starts.

The operation of the circuit may be described by first assuming that the three conductor stages of Fig. 2 are the stages which are used to designate the digit "2." Let it further be assumed that the units order stage 26 has been actuated and the amount accumulated is 002. Before the actuating pulse is sent over conductor 22, the potentials of the control electrodes of the various gate stages are as follows: Stage 46, left hand control electrode, connected by conductors 57 and 58 to a high potential anode in hundreds stage 28 and a high potential anode in units stage 26 (the units having been actuated). Stage 46 right hand control electrode, connected by conductors 60 and 61 to a low potential anode in stage 26 and a low potential anode in stage 28. Therefore, the left hand control electrode of stage 46 is 15 volts below the cathode because both its coupled anodes are high, and the right hand control electrode is 60 volts below the cathode because both its coupled anodes are low.

In a similar manner the left hand control electrode of stage 40 is 37 volts below the potential of its cathode because of the two connections over conductors 62 and 63 to the low anode in stage 28 and the high anode in stage 27. The right hand control electrode of stage 40 is also at 37 volts below its cathode because of the two connections over conductors 57 and 41 to the high anode in stage 28 and the low anode in stage 27.

The potentials of the control electrodes of gate stage 33 are as follows: left hand control electrode is −60 volts because of connections over conductors 41 and 60 to low anode of stage 27 and low anode of stage 26; right hand control electrode is −15 volts because of connections over conductors 58 and 63 to the high anode of stage 26 and the high anode of stage 27.

The net result of the above potential distribution is that two of the six gates are in the "open" position; that is, a positive pulse applied from stage 54 over conductor 22 will pass the left hand side of stage 46 and the right hand side of stage 33. Both these triodes are at 15 volts below the cathode potential, which for these tubes is approximately the anode current cut-off point.

The positive shift pulse sent out by stage 54 is about 75 volts but after passing through the coupling capacitors 47, it is cut down to about 20 volts. The result of this pulse is two negative pulses, one of which is applied over conductor 64 to the right hand control electrode of trigger stage 26 which is conducting on that side. The negative pulse actuates the stage and returns the conductance to the left hand side, the normal or zero condition.

The second negative pulse is generated at the right hand anode of stage 33 and is applied over conductors 32 and 30 to the left hand control electrode of trigger stage 27, actuating the stage and shifting conductance to the right hand side, thereby designating a "2" in the tens order. The digit designation before the shift operation was 002, after a single shift pulse the designation is 020. The change in conductivities of the trigger stages produces a new pattern of potentials for the gate tubes so that a second shift pulse will go through different gates and change the 020 to 200.

The foregoing operation considered only the shift of a single digit. Successive digits may be shifted in the same manner. Let it be assumed that the number 022 is entered into the counter system. Then the units stage 26 and the tens stage 27 will be actuated and conducting on the right hand side. The potentials of the control electrodes of the gate stages are then −15 and −60 for the left and right hand triodes of stage 46; −60 and −15 for the left and right triodes of stage 40; and −37 for both triodes of stage 33. The shift pulse will, therefore, be transferred through the left hand side of stage 46 and send a negative pulse over conductor 64 to actuate the trigger stage 26 and return its conductance to the left hand or normal side. The shift pulse will also be transferred through the right hand side of gate stage 40 and be applied over conductor 65 to the left hand control electrode of trigger stage 28, thereby changing its conductance to the right hand anode. The tens trigger stage 27 is not changed by the first shift pulse. Since the units trigger stage has been normalized and the other two are in their actuated condition, the counter indicates 220 instead of 022. A second shift pulse would change the indicated number to 202.

Figure 4:
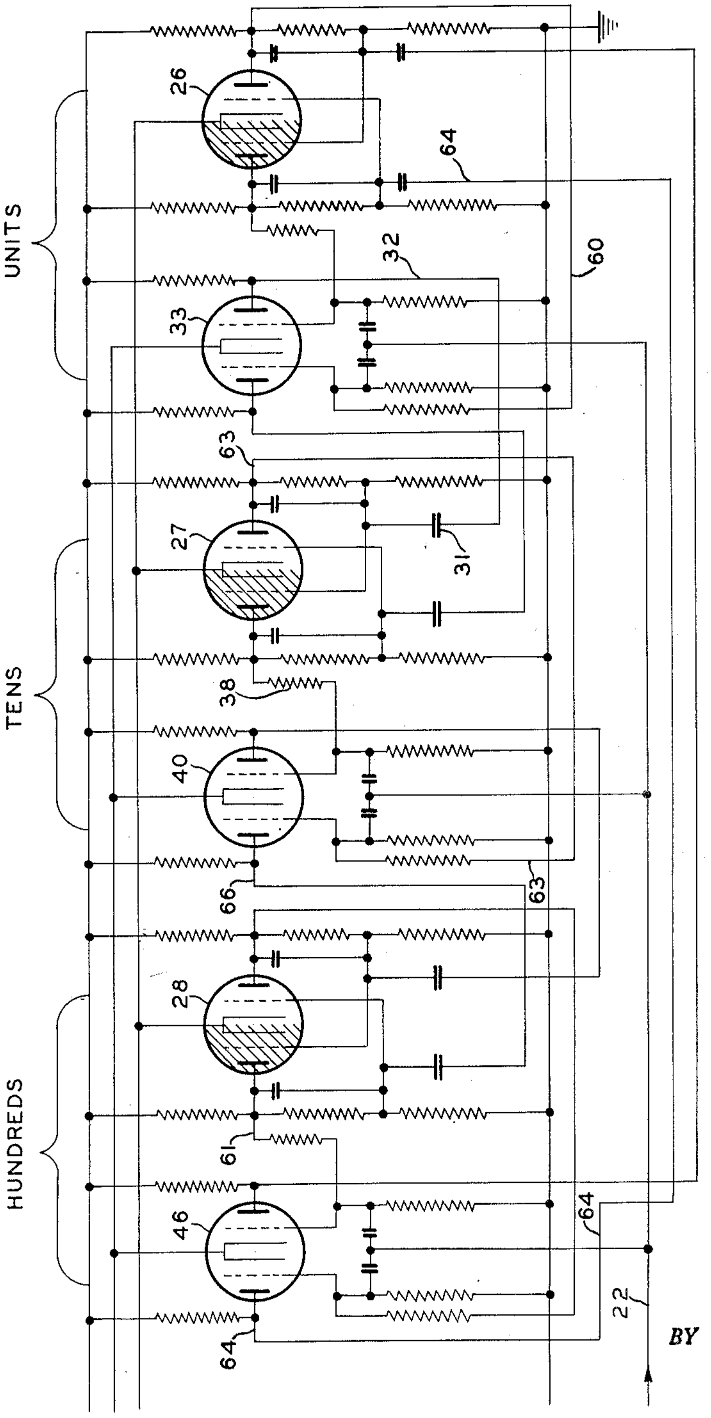
Fig. 4 is a schematic wiring diagram of connections of an alternate manner of connecting the accumulator stages and may be used instead of the system shown in Fig. 2.

The circuit shown in Fig. 4 gives the same end result as the circuit shown in Fig. 2, but is simpler, has fewer resistors and fewer conductors. The coupling lines which run from the anodes of the gate stages through coupling capacitors to the grids of the trigger stages are the same as the connections of Fig. 2. However, the anodes of the trigger stages 26, 27, and 28 are coupled to only one control electrode in the gate stages instead of two. This results in a different arrangement of control electrode potentials and a slightly different operation, but the result is the same.

To illustrate the difference, let it be assumed that the units trigger stage has been actuated, thereby indicating a 002. The potentials of the gate control electrodes are as follows: Stage 46, the left hand control electrode is connected to a high potential anode in stage 28, therefore, its potential is −15 volts or at the cut-off value. The right hand control electrode of stage 46 is coupled to the low potential anode in stage 28, therefore, its potential is −60 volts.

Gate stage 40 has the same conditions and the same potentials for its control electrodes. Gate stage 33 is just the reverse of the other gate stages because the trigger stage 26 has been actuated and applies a potential of −60 volts to the left control electrode and −15 volts to the right.

When a shift pulse is sent over conductor 22 to all the gate stages, a pulse is transmitted through each one. The left anode of stage 40 sends a negative pulse over conductor 66 to the right hand control electrode of trigger stage 28 which has no effect since the stage is in its zero condition and is conducting on the left.

The right hand anode of stage 33 sends a negative pulse over conductor 32, through capacitor 31 to the left hand control electrode of trigger stage 27, actuating the stage and thereby indicates the number 020.

It will be evident from the above that the system illustrated in Fig. 4 sends the actuating shift pulses to the same trigger stages that are supplied in the system of Fig. 2, and, in addition, sends shift pulses to one or more trigger stages which are not affected thereby.

The above descriptions have been confined to a digit accumulator having only three orders. A standard sized accumulator for use in calculating machines controlled by punched data cards may employ twenty two denominational orders. The construction and operation of a large system is the same as has been described above.

It will be evident from the above description that the invention provides a means of shifting all digit values one or more denominational orders under control of a program unit.

While there have been described and illustrated specific embodiments of the invention, it will be obvious that various changes and modifications may be made therein without departing from the field of the invention which should be limited only by the scope of the appended claims.

What is claimed is:

1. A digit shifting circuit for shifting an accumulated digit value from one denominational order of an electronic accumulator to the adjacent order comprising, a plurality of electronic trigger stages in each order, each representing a digit, a plurality of gate stages for controlling the application of a shift pulse to the trigger stages, circuit means for coupling the anodes of each trigger stage to the gate stages for changing the potential of the gate control electrodes when a trigger stage has been actuated, circuit means for coupling the anodes of each gate stage to the control electrode of the corresponding trigger stage in the adjacent order, and control means for applying the shift pulse to all gate stages.

2. A digit shifting circuit for shifting an accumulated digit value from one denominational order of an electronic accumulator to the adjacent order comprising; a plurality of electronic trigger stages in each order, each representing a digit, a plurality of gate stages for controlling the application of a shift pulse to the trigger stages, each of said gate stages associated with one of said trigger stages; circuit means for coupling the anodes of each trigger stage to the gate stages for changing the potential of the gate control electrodes when a trigger stage has been actuated; circuit means for coupling the anodes of each gate stage to the control electrode of the corresponding trigger stage in the adjacent order; and control means for applying the shift pulse to all gate stages.

3. A digit shifting circuit for shifting an accumulated digit value from one denominational order of an electronic accumulator to the next higher order comprising; a plurality of electronic trigger stages in each order, each representing a digit, a plurality of gate stages for controlling the application of a shift pulse to the trigger stages, each of said gate stages associated with one of said trigger stages; circuit means for coupling the anodes of each trigger stage to the gate stages for changing the potential of the gate control electrodes when a trigger stage has been actuated; circuit means for coupling the anodes of each gate stage to the control electrode of the corresponding trigger stage in the next higher order; and control means for applying the shift pulse to all gate stages for transmission through selected gates to normalize the actuated trigger stages and to actuate the corresponding trigger stage in the next higher denominational order.

4. A digit shifting circuit for shifting an accumulated digit value from one denominational order of an electronic accumulator to the next higher order comprising; a plurality of electronic trigger stages in each order, each containing two triodes and each representing a digit, a plurality of gate stages, each containing two triodes, for controlling the application of a shift pulse to the trigger stages, each of said gate stages associated with one of said trigger stages; circuit means for coupling the anodes of each trigger stage to the gate stages for changing the potential of the gate control electrodes when a trigger stage has been actuated; circuit means for coupling the anodes of each gate stage to the control electrode of the corresponding trigger stage in the next higher order; and control means for applying the shift pulse to all gate stages for transmission through selected gates to normalize the actuated trigger stages and to actuate the corresponding trigger stage in the next higher denominational order.

5. A digit shifting circuit for shifting an accumulated digit value from one denominational order of an electronic accumulator to the next higher order comprising; a plurality of electronic trigger stages in each order, each containing two triodes and each representing a digit, a plurality of gate stages, each containing two triodes, for controlling the application of a shift pulse to the trigger stages; each of said gate triodes having a normal control electrode potential far below the cut-off value; circuit means for coupling the anodes of each trigger stage to the gate stages for changing the potential of the gate control electrodes when a trigger stage has been actuated; circuit means for coupling the anodes of each gate stage to the control electrode of the corresponding trigger stage in the next higher order; and control means for applying the shift pulse to all gate stages for transmission through selected gates to normalize the actuated trigger stages and to actuate the corresponding trigger stage in the next higher denominational order.

6. A digit shifting circuit for shifting a digit value from one denominational order of an electronic accumulator to the next higher order comprising; a plurality of electronic trigger stages, each containing two triodes and each representing a digit value, arranged in denominational orders; a plurality of electronic gate stages, each containing two triodes, for controlling the application of a shift pulse to said trigger stages, each of said gate triodes having a normal control electrode potential far below the cut-off value; circuit connecting means for coupling the anodes of each trigger stage to one of the control electrodes of each of two gate stages for raising the potential of said control electrodes when one or more trigger stages have been actuated; circuit connecting means for coupling the anodes of each gate stage to the control electrodes of the corresponding trigger stage in the next higher denominational order, except for the highest order gate stage which is coupled to the lowest order trigger stage; and control means for applying the shift pulse to the control electrodes of all gate stages for transmission through selected gates to normalize the actuated trigger stages and actuate the corresponding trigger stage in the next higher denominational order to shift the recorded digit value.

7. A digit shifting circuit for shifting a digit value from one denominational order of an electronic accumulator to the next higher order comprising; a plurality of electronic trigger stages, each containing two triodes and each representing a digit value, arranged in denominational orders; a plurality of electronic gate stages, each containing two triodes, for controlling the application of a shift pulse to said trigger stages, each of said gate triodes having a normal control electrode potential far below the cut-off value; circuit connecting means for coupling the anodes of each trigger stage to one of the control electrodes of each of two gate stages for raising the potential of said control electrodes when one or more trigger stages have been actuated; circuit connecting means for coupling the anodes of each gate stage to the control electrodes of the corresponding trigger stage in the next higher denominational order through capacitors; and control means for applying the shift pulse to the control electrodes of all gate stages for transmission through selected gates to normalize the actuated trigger stages and actuate the corresponding trigger stage in the next higher denominational order to shift the recorded digit value.

8. A digit shifting circuit for shifting a digit value from one denominational order of an electronic accumulator to the next higher order comprising; a plurality of electronic trigger stages, each containing two triodes and each representing a digit value, arranged in denominational orders; a plurality of electronic gate stages, each containing two triodes, for controlling the application of a shift pulse to said trigger stages, each of said gate triodes having a normal control electrode potential far below the cut-off value; circuit connecting means for coupling the anodes of each trigger stage through resistors to one of the control electrodes of each of two gate stages for raising the potential of said control electrodes when one or more trigger stages have been actuated; circuit connecting means for coupling the anodes of each gate stage to the control electrodes of the corresponding trigger stage in the next higher denominational order through capacitors; and control means for applying the shift pulse to the control electrodes of all gate stages for transmission through selected gates to normalize the actuated trigger stages and actuate the corresponding trigger stage in the next higher denominational order to shift the recorded digit value.

9. A digit shifting circuit for shifting a digit value from one denominational order of an electronic accumulator to the next higher order comprising; a plurality of electronic trigger stages, each containing two triodes and each representing a digit value, arranged in denominational orders; a plurality of electronic gate stages, each containing two triodes, for controlling the application of a shift pulse to said trigger stages, each of said gate triodes having a normal control electrode potential far below the cut-off value; circuit connecting means for coupling the anodes of each trigger stage to the control electrodes of two gate stages through resistors, one of said gate stages being the corresponding stage in the same order and the second of said stages being the corresponding stage in the next lower order; circuit connecting means for coupling the anodes of each gate stage to the control electrodes of the corresponding trigger stage in the next higher denominational order through capacitors; and control means for applying the shift pulse to the control electrodes of all gate stages for transmission through selected gates to normalize the actuated trigger stages and actuate the corresponding trigger stage in the next higher denominational order to shift the recorded digit value.

LORING P. CROSMAN.

REFERENCES CITED

The following references are of record in the file of this patent:

UNITED STATES PATENTS

| Number | Name | Date |
|---|---|---|
| 2,404,047 | Flory et al. | July 16, 1946 |
| 2,435,841 | Morton et al. | Feb. 10, 1948 |
| 2,484,115 | Palmer et al. | Oct. 11, 1949 |

OTHER REFERENCES

"Interim Progress Report on the Physical Realization of an Electronic Computing Instrument," Bigelow et al., Institute for Advanced Study, Jan. 1, 1947, pages 99*b*–99*c*.